Figure 1:
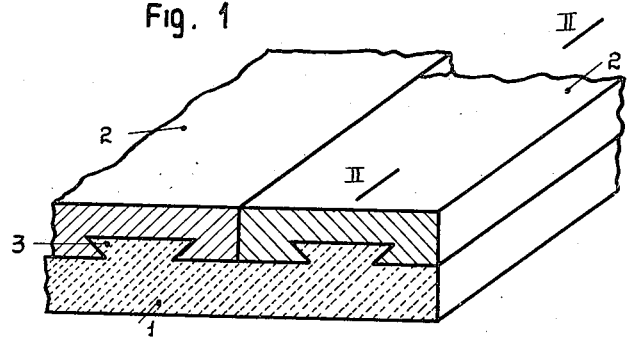

June 16, 1936.　　S. LUZZATI ET AL　　2,044,535
WOOD TILE FOR FLOORING AND PANELING
Filed April 25, 1933

Inventors
Salvatore Luzzati,
Cesare Molinari,
By Sommers & Young Attys.

Patented June 16, 1936

2,044,535

UNITED STATES PATENT OFFICE 2,044,535

WOOD TILE FOR FLOORING AND PANELING

Salvatore Luzzati and Cesare Molinari, Turin, Italy

Application April 25, 1933, Serial No. 667,879
In Italy April 30, 1932

4 Claims. (Cl. 20—7)

This invention relates to tiles comprising an upper layer of wood and a lower layer of cement and its object is to improve the process of manufacture in order to make the two layers inseparable from each other.

The object of this invention is to provide a tile having substantially the same strength as the usual cement, ceramic and like tiles, which can be laid as easily, with the advantage that its upper face is of wood. The wood layer can be of one or more pieces of the same quality or of different qualities distributed according to a predetermined order.

A further object of this invention is to provide a tile, in which the adhesion between the wood layer and the cement layer is not affected by deformations or by moisture. This is obtained by employing a cement composition which is perfectly water-tight, so that moisture cannot act upon the adhesion surface, is unaffected by temperature and does not shrink in setting.

According to this invention the cement composition is constituted by a metal salt basis cement or an agglomerate of organic and inorganic materials (according to desired tile weight) in which the binder is a cement of the above mentioned type, to which substances adapted to make the cement layer waterproof and to prevent shrinkage on setting are added.

As metal salt cement we may mention e. g. magnesium, zinc, iron, manganese, calcium, oxychloride and like cements.

The substances which prevent shrinkage and make the cement water-proof and the quantities added vary according to the type of metallic salt cements employed.

When a cement composed e. g. of magnesium sulphate and calcined magnesia is used, we add a percentage of barium chloride variable according to the magnesium content of the magnesia employed when a magnesium chloride and magnesite cement is used, monocalcic phosphate or acid calcium phosphate is used for preventing shrinkage and oleate or stearate of magnesia for waterproofing; when a zinc oxide cement is used, borax or sodium nitrate in small quantities or ammonium chloride in larger quantities are added to prevent shrinkage, and oleate or stearate or even aluminium chloride is added for water-proofing.

The substances mentioned above and other substances, which can be employed for the said purposes, can be used with more or less satisfactory results for all metal salt cements and the fact that we have mentioned them for one or the other cement means that the substances specified are more effective for one than for the other, but it does not imply that they cannot be used as well for all metal salt cements.

The lower layer according to this invention is not liable to shrink and remains therefore perfectly adherent to the wood so that this latter is perfectly insulated. As this layer is waterproof, it efficiently protects the wood against the moisture of the mortar used for laying the tiles and the moisture of the base on which they are placed.

The tiles are obtained by spreading on a surface formed by one or more pieces of wood, of the desired size, a layer of pure cement of the type indicated, or an agglomerate obtained by mixing cement with sand, fine gravel, sawdust, cork powder or lumps, etc.

When the tiles are of considerable size and it is not desired to make the backing layer of an excessive thickness, a metallic armature can be incorporated in said layer.

To obtain an improved and stronger adhesion between the wood layer and the cement backing layer, we form on the lower face of the wood layer undercut recesses of circular, rectangular or any other form spaced from one another, so that the cement backing layer is strongly anchored to the wood layer. The use of undercut recesses, instead of continuous grooves, has the advantage of eliminating lines of smaller resistance and causes of breakage of the cement backing layer and of the upper wood layer. This method of anchoring has the further advantage of forming an armature in the thickness of the wood such as to prevent excessive expansion and shrinkage of the wood.

The method of connecting and insulating the wooden tile portion according to this invention has the important advantage of allowing the laying of parquet floors by placing the tiles, obtained in the manner indicated above, on the masonry or concrete base by means of a cement mortar without any risk of the moisture of said mortar reaching the wood with the well known objectionable results.

The wood tiles according to this invention can be laid in the same manner as usual tiles, without requiring craft specially skilled in laying parquet floors.

The parquet floors formed by the tiles according to this invention have the further advantage, as compared with usual floors, that they are completely sound-proof and do not yield, so that the cracking inherent to the usual parquet floors is avoided.

The process of manufacture of the tiles according to this invention can be employed with any type, size and form of tiles, and with any type of wood. It is thus possible to make e. g. tiles of one wood piece, or to assemble a plurality of wood pieces of the same or of different types and forming any desired design.

The accompanying drawing shows, by way of example, a construction of the tile according to this invention.

Figure 2:
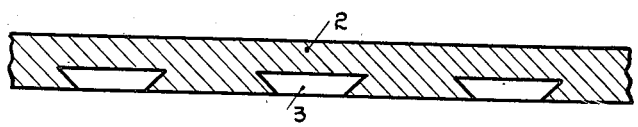
Figure 3:
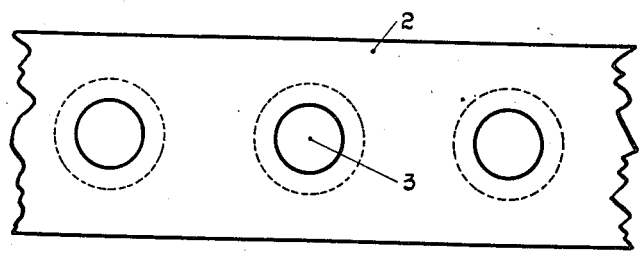

Figure 1 is a partial perspective view;
Figure 2 is a sectional view of an element of the wood layer on line II—II of Figure 1.
Figure 3 is a view of said element from underneath.

Referring to the drawing, 1 denotes the backing layer formed by metal salt cement in the manner described; 2 denotes wood boards placed side by side and forming the upper tile layer. On the contact face of the strips 2 spaced circular undercut recesses 3 are formed. During the manufacture of the tile the material of the backing layer is embedded in these recesses thus solidly anchoring together the wood boards. The drawing shows that this method of anchoring eliminates the lines of smaller resistance.

What we claim is:

1. In a composite wood and cement tile for flooring and panelling, a backing layer comprising a magnesium chloride and magnesite cement, acid calcium phosphate for preventing shrinkage of the cement during setting and a waterproofing substance.

2. In a composite wood and cement tile for flooring and panelling, a backing layer comprising a magnesite and magnesium chloride cement, acid calcium phosphate for preventing shrinkage of the cement during setting and a waterproofing substance, and a top layer of wood comprising a plurality of elements each having on its lower face undercut recesses spaced from one another and from the edges of the tile, said recesses being filled by the cement layer.

3. In a composite wood and cement tile for flooring and panelling, a backing layer comprising a magnesium sulphate and calcined magnesia cement, barium chloride for preventing shrinkage of the cement during setting and a waterproofing substance.

4. In a composite wood and cement tile for flooring and panelling, a backing layer comprising a magnesium sulphate and calcined magnesia cement, barium chloride for preventing shrinkage of the cement during setting and a waterproofing substance, and a top layer of wood comprising a plurality of elements each having on its lower face undercut recesses spaced from one another and from the edges of the tile, said recesses being filled by the cement layer.

SALVATORE LUZZATI.
CESARE MOLINARI.